United States Patent
Watanabe et al.

(10) Patent No.: US 7,344,256 B2
(45) Date of Patent: Mar. 18, 2008

(54) PROJECTION TYPE IMAGE DISPLAY APPARATUS

(75) Inventors: Takashi Watanabe, Saitama (JP); Kenichi Shiba, Shizuoka (JP); Minoru Ogita, Shizuoka (JP)

(73) Assignees: Fujinon Corporation, Saitama (JP); Yamaha Corporation, Hamamatsu (JP)

( * ) Notice: Subject to any disclaimer, the term of this patent is extended or adjusted under 35 U.S.C. 154(b) by 284 days.

(21) Appl. No.: 11/211,427

(22) Filed: Aug. 26, 2005

(65) Prior Publication Data
US 2006/0044527 A1    Mar. 2, 2006

(30) Foreign Application Priority Data
Aug. 30, 2004    (JP) .............................. 2004-250254

(51) Int. Cl.
G03B 21/14    (2006.01)
G02F 1/00    (2006.01)
(52) U.S. Cl. ........................... 353/97; 353/94; 348/771
(58) Field of Classification Search ................. 353/94, 353/97, 102; 348/770, 771; 362/559, 560, 362/556
See application file for complete search history.

(56) References Cited

U.S. PATENT DOCUMENTS

| | | | |
|---|---|---|---|
| 6,588,908 B2 | 7/2003 | Shimizu | |
| 6,874,894 B2* | 4/2005 | Kitamura | 353/97 |
| 6,886,944 B2* | 5/2005 | Dahlgren | 353/97 |
| 7,252,395 B2* | 8/2007 | DiCarlo et al. | 353/99 |
| 2003/0086066 A1* | 5/2003 | Kato | 353/20 |
| 2003/0202259 A1* | 10/2003 | Nishimae et al. | 359/726 |

FOREIGN PATENT DOCUMENTS

| | | |
|---|---|---|
| JP | 8-227034 | 9/1996 |
| JP | 10-253923 | 9/1998 |
| JP | 2002-287081 | 10/2002 |

OTHER PUBLICATIONS

"DLP™ technology and its mechanism for projection" from Texas Instruments Japan Limited., searched on Mar. 3, 2003, via the Internet, <URL:http://www.tij.co.jp/jrd/dlp/docs/technology/techsystem.htm>.

* cited by examiner

Primary Examiner—Andrew T. Sever
(74) Attorney, Agent, or Firm—Arnold International; Bruce Y. Arnold

(57) ABSTRACT

A DMD (digital micromirror device) includes a substantially rectangular element face made up of plural mirror elements arranged in a matrix. The DMD is provided with a light shielding cover having a light transmitting portion which corresponds to the element face. Radiated from the illumination optical system including a rod integrator, the illumination light enters the element face, on a flat surface including the diagonal line of the element face, at an inclined angle with respect to the normal to the element face. Near a light exit face of the rod integrator, a mask plate is disposed to regulate a part of the illumination light. The mask plate has a mask aperture of substantially rhombus shape. The illumination light passing the mask aperture is reshaped so that an illumination area can be a substantially rectangular shape on the element face.

6 Claims, 11 Drawing Sheets

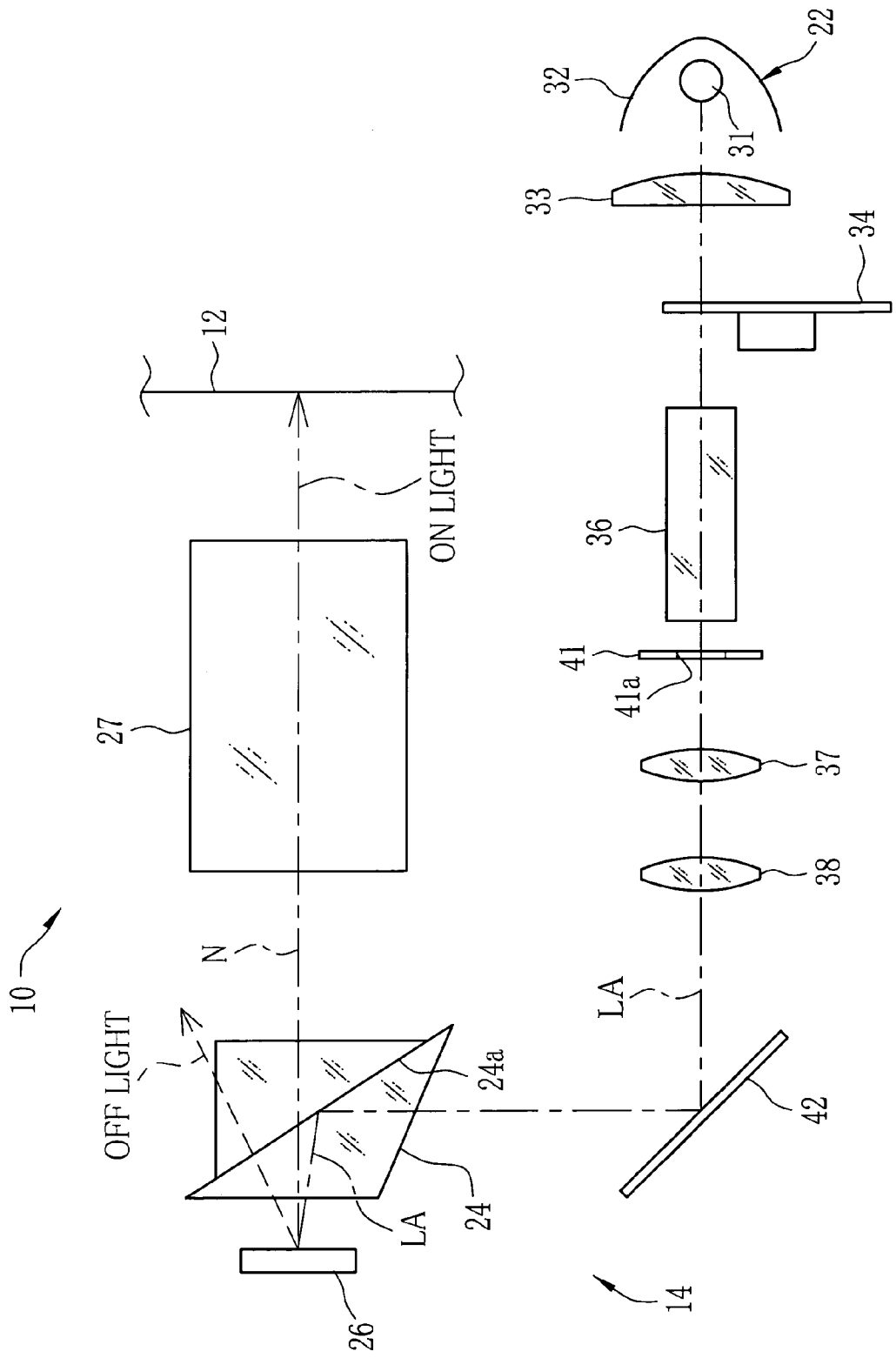

PROJECTION TYPE IMAGE DISPLAY APPARATUS

BACKGROUND OF THE INVENTION

1. Field of the Invention

The present invention relates to a projection type image display apparatus which projects light modulated by a digital micromirror device (hereinafter referred to as DMD) on a display screen to display images.

2. Background Arts

There is a projection type image display apparatus which modulates illumination light from an illumination optical system with using a DMD to form an image light, which is then projected on a display screen through a projection optical system (see, for example, U.S. Pat. No. 6,588,908 corresponding to the Japanese patent laid-open publication No. 2002-350775). This projection type image display apparatus is of widespread use as a big screen TV receiver. The DMD is made up with a plurality of swingable mirror elements (hereinafter called mirror elements) arranged in a matrix, each of which elements can swing between an ON position to reflect the illumination light toward the projection optical system and an OFF position to reflect the illumination light off the projection optical system. Operating on modulated image signals, the DMD holds the mirror elements in the ON position either for a long duration of time to brighten the pixels or for a short duration of time to darken the pixels. Such control of the illumination light amount onto the display screen achieves proper light modulation that accords the image signals.

As shown in FIGS. 11A and 11B, the DMD 101 is composed of a substrate 103 and a cover 106 for covering a front face of the substrate 103. Mounted on the substrate 103 is the mirror unit 102, which has plural mirror elements arranged in a matrix. Around the mirror unit 102, bonding pads 104 are provided to connect the mirror unit 102 to a driving circuit through wires. If laid bare, the bonding pads 104 will spoil the appearance of the DMD, and even worse, they will diffusely reflect the illumination light to create harmful light (or noise light). The cover 106 is therefore divided into two portions, a light transmitting portion 107 that transmits the illumination light heading to an element face 102a of the mirror unit 102 and a light shielding portion 108 that surrounds the light transmitting portion 107 to block the illumination light heading off the element face 102a. The cover 106 is, for example, a transparent glass 106a with its rear face coated with a frame shaped light shielding layer 106b, and the uncoated portion thus forms the light transmitting portion 107. The light transmitting portion 107 is nearly a 4:3 aspect ratio rectangle that conforms to the shape of the element face 102a, so that the light shielding portion 108 can surely cover the substrate 103 except for the element face 102a. Such shielding contributes not only to improve the appearance of the DMD, but also to prevent the creation of the harmful light resulting from the bonding pads 104.

Even with the cover 106, however, if the illumination light runs off the light transmitting portion 107 to define the illumination area there, the illumination light reflects diffusely on a boundary of the light transmitting portion 107 and the light shielding portion 108, causing the harmful light. Therefore a mask plate with a substantially rectangular mask aperture, which conforms to the shape of the light transmitting portion 107, is disposed near a light exit section of the illumination optical system (see, for example, Japanese patent laid-open publication No. 8-227034 and No. 10-253923).

Each of the mirror elements, which constitute the element face 102a of the DMD 101, can swing on a rotation axis extending on the diagonal line of the mirror element. Considering the reflection efficiency of the mirror element taking such posture, a light axis LA of the illumination light striking the element face 102a should preferably be inclined, with respect to the normal N to the element face 102a, in a diagonal direction of the element face. Unfortunately, when the light axis LA is inclined, an illumination area 110 becomes a rhombus shape, not a rectangle shape, on the light receiving surface of the DMD 101. It is particularly difficult to form the illumination area 110 to fit within the light transmitting portion 107 and entirely cover the element face 102a at the same time. The creation of the harmful light is therefore hardly prevented on the boundary of the light transmitting portion 107 and light shielding portion 108.

In addition, if the illumination area 110 of such rhombus shape is stretched to the light shielding portion 108, the cover 106 is dimly illuminated by diffuse reflection of the illumination light. This results in unnecessary illumination in the peripheral area around the element face 102a of the mirror unit 102, glimmering the suppose-to-be dark areas of the projected image on the display screen.

SUMMARY OF THE INVENTION

In view of the foregoing, a primary object of the present invention is to provide a projection type image display apparatus which can prevent the creation of harmful light on the boundary of a light transmitting portion and a light shielding portion in a cover of a DMD.

Another object of the present invention is to provide the projection type image display apparatus which can limit illumination light toward the DMD precisely to conform to the outline of an element face of a mirror unit.

To achieve the above and other objects of the present invention, the projection type image display apparatus of the present invention includes an illumination optical system for radiating illumination light, an integrator (light guide) for equalizing illuminance of the illumination light, a micromirror device with plural mirror elements arranged in a matrix to reflect the illumination light, and a mask plate, which is disposed near a light exit face of the integrator, including a mask aperture to pass the illumination light.

The micromirror device has a quadrangular element face where the plural mirror elements are swingably arranged.

The mask aperture is formed in a substantially rhombus shape and is disposed perpendicular to a light axis of the illumination light. The illumination area of the illumination light on the element face is thereby shaped into a rectangle, which conforms to the shape of the element face.

In another embodiment of the present invention, the mask aperture is formed in a substantially rectangular shape and is inclined to the light axis of the illumination light. This configuration can also shape the illumination area of the illumination light on the element face into a rectangle, which conforms to the shape of the element face.

Still another embodiment offers an integrator, which allows the illumination light from the light source to enter the micromirror device from a specific direction at a predetermined angle, and a mask aperture in the shape of the element face outline but reduced in this specific direction and expanded in the opposite direction to the specific direction.

According to the present invention, the illumination area can be shaped into a rectangle either by using a rhombus shaped mask aperture in the mask plate disposed near the light exit face of the rod integrator or by inclining the mask plate with respect to the light axis of the illumination optical system. It is therefore possible to prevent the creation of the harmful light on the boundary of the light transmitting portion and light shielding portion of the cover for the DMD.

In the still another embodiment of the present invention, the peripheral area around the element face is not illuminated even if the light enters at a certain angle. Thus, the dark area in the projected image is not dimly illuminated on the display screen.

BRIEF DESCRIPTION OF THE DRAWINGS

For a more complete understanding of the present invention, and the advantage thereof, reference is now made to the following descriptions taken in conjunction with the accompanying drawings, in which:

FIG. 1 is a schematic view of a projection type image display apparatus of the present invention;

DESCRIPTION OF THE PREFFERED EMBODIMENTS

Figure 2A:
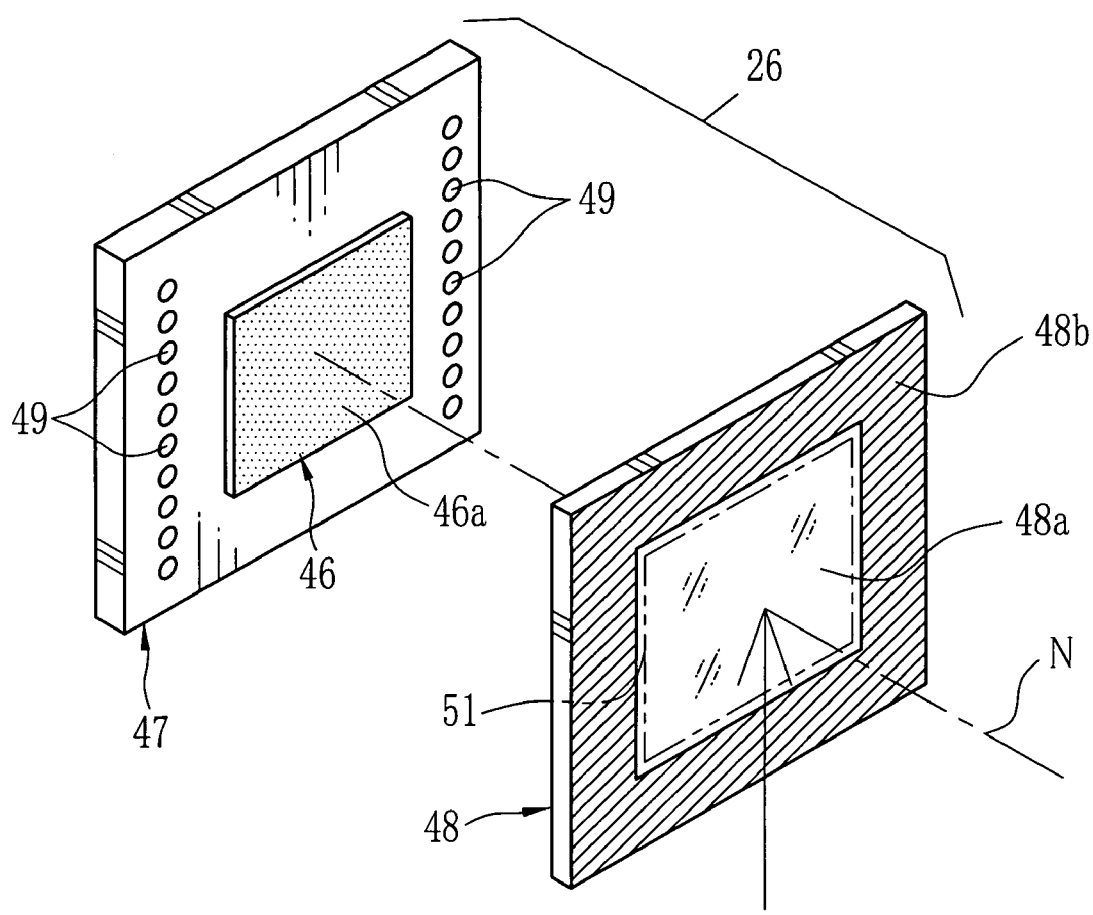
FIG. 2A is an exploded perspective view of a DMD.

Referring now to FIG. 1, a projection type image display apparatus 10 operates a projection unit 14 by means of a micro computer (not shown) according to image signals so as to display projection images on a display screen 12. An optical system of the projection unit 14 includes a light source section 22, an illumination optical system, a total reflection prism 24, a DMD 26, and a projection optical system 27. The projection unit 14 adopts a single plate method where three color image light beams are created by a single DMD 26.

The projection optical system 27 is made by installing in a lens barrel a projection lens, a lens shift mechanism for focusing and zooming, an aperture stop mechanism and the like, and projects the image light created by the DMD 26 onto the display screen 12.

The light source section 22 is composed of a light source 31 and a reflector 32 for reflecting the illumination light from the light source 31 toward the illumination optical system. The light source 31 will be a white light source such as a xenon lamp or a mercury lamp. The illumination optical system is composed of a condenser lens 33, a color wheel 34, a rod integrator 36, and relay lenses 37, 38.

The color wheel 34 divides the illumination light beam, which is irradiated from the light source section 22 then gathered by the condenser lens 33, into three colors of RGB on a time division basis. The color wheel 34 is, as is known in the art, a substantially circular basal plate equipped thereon with a B filter segment for transmitting only a blue light, a G filter segment for transmitting only a green light, and a R filter segment for transmitting only a red light at equal distances from the basal plate pivot. The color wheel 34 is controlled by the microcomputer on both its start timing of rotation and its rotation speed. The color wheel 34 inserts these filter segments sequentially in the light path when it rotates. This insertion divides the illumination light into three colors of RGB on the time division basis, and each of the divided three color light beams strikes the DMD 26 one after another.

The rod integrator 36 equalizes each colored light divided by the color wheel 34 so that the light intensity distribution can become even throughout an light receiving surface of the DMD 26. The rod integrator 36 is a quadrangular prism made up of clad and core glasses of different refractive index. The illumination light entering the rod integrator 36 reflects many times at the boundary of the clad and core by total reflection as it advances inside the rod, then exits the rod with its density equalized. The rod integrator functions as a light guide, which will be either of, for example, a quadrangular glass pole with a reflective outer surface or a quadrangular tube with a reflective inner or outer surface.

The illumination light exiting the rod integrator 36 is relayed by the relay lenses 37, 38 and enters a reflection mirror 42. The reflection mirror 42 bends an illumination light axis LA by 90 degrees toward the total reflection prism 24. The total reflection prism 24 separates the light entering to the DMD 26 from the light reflected on the DMD 26. The total reflection prism 24 is constituted of, for example, two triangular prisms of different refractive index. These prisms form a reflecting surface 24a at their boundary. The light entering the DMD 26 will enter the prism at a larger angle than a critical angle of the reflecting surface 24a, and is therefore totally reflected to the DMD 26. In contrast, the reflected light from the DMD 26 will enter the prism at a smaller angle than the critical angle of the reflecting surface 24a, and therefore passes through the reflecting surface 24a.

The DMD 26 is provided thereon with plural mirror elements arranged in a matrix. And a single mirror element corresponds to one pixel. Each of the mirror elements can swing in response to the image signals so as to change the reflection direction of the illumination light. Concretely, the illumination light is reflected toward the projection optical system 27, as an ON light, when the mirror element is set in the ON position while it is reflected outside the projection optical system 27, as an OFF light, when the mirror element is set in the OFF position. The image light is a collection of the ON lights that head to the projection optical system 27. Through the control on the ON light amount, the gradation of pixel can be expressed.

Figure 2B:
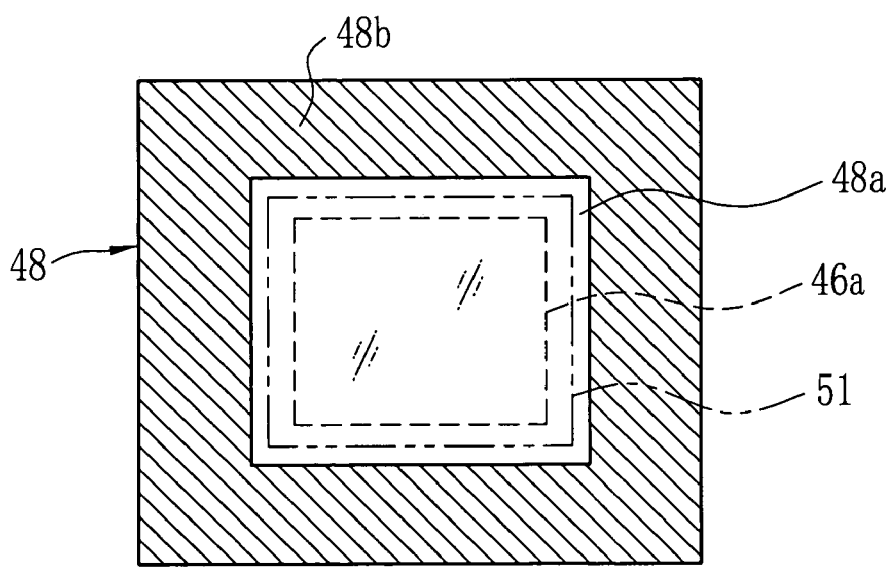
FIG. 2B is a plan view of the DMD.

As shown in FIGS. 2A and 2B, the DMD 26 is composed of a substrate 47 including a mirror unit 46 with plural mirror elements arranged in a matrix and a cover 48 for covering a front face of the substrate 47. Around the mirror unit 46, plural bonding pads 49 are provided for wire connection. The cover 48 is made of, for example, a transparent glass plate to transmit the illumination light to an element face 46*a* through a light transmitting portion 48*a*. The light transmitting portion 48*a* is surrounded by a light shielding portion 48*b* so that the bonding pads 49 can be covered. The light shielding portion 48*b* is formed by, for example, coating the inner or outer surface of the cover 48 with a light shielding film. The light transmitting portion 48*a* takes a substantially rectangular shape that conforms to the shape of the element face 46*a*, but its size is slightly larger than that of the element face 46*a*. The whole element face 46*a* can thereby be illuminated by the illumination light.

Since each mirror element swings on two corners on a first mirror diagonal line, other two corners on a second mirror diagonal line move up and down. And the mirror elements are arranged in a matrix form on the quadrangular element face. This element face has a first element face diagonal line and a second element face diagonal line. The first and second mirror diagonal lines are in parallel with the first and second element face diagonal lines respectively. The illumination light axis passes on a flat surface, which is perpendicular to the element face and extends along the second element face diagonal line, and is inclined with respect to the vertical line to the center of the element face. That is, the illumination light goes to the second element face diagonal line with a predetermined angle.

Figure 3A:
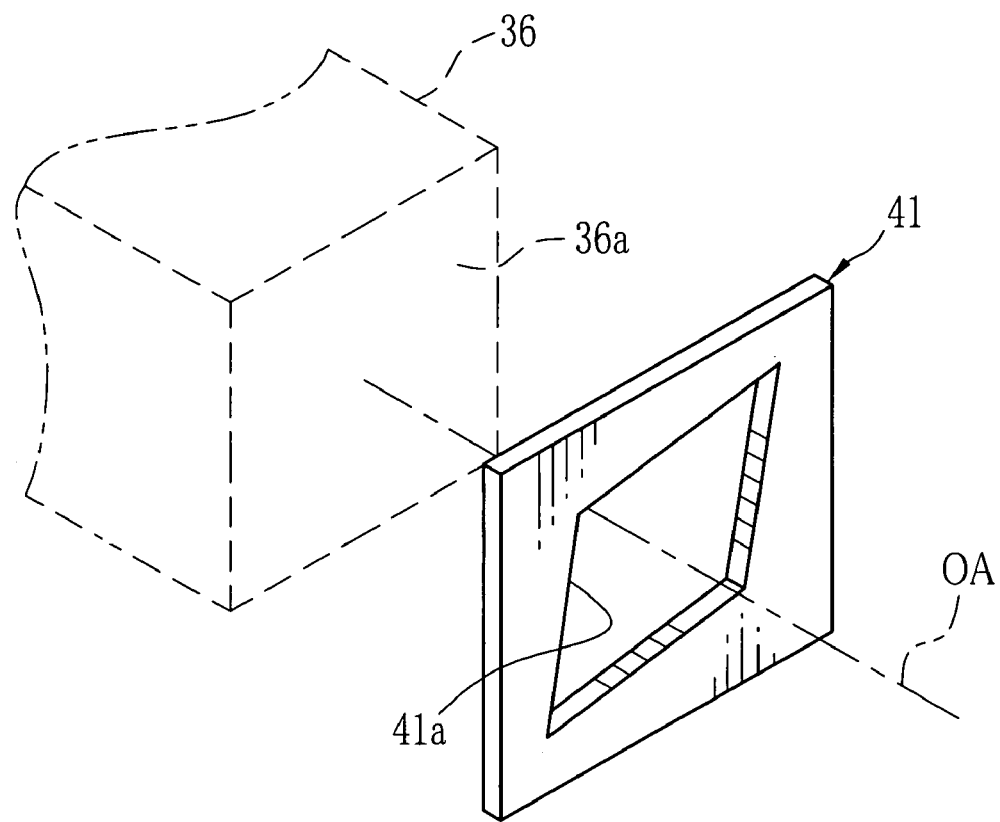
FIG. 3A is a perspective view of a mask plate.
Figure 3B:
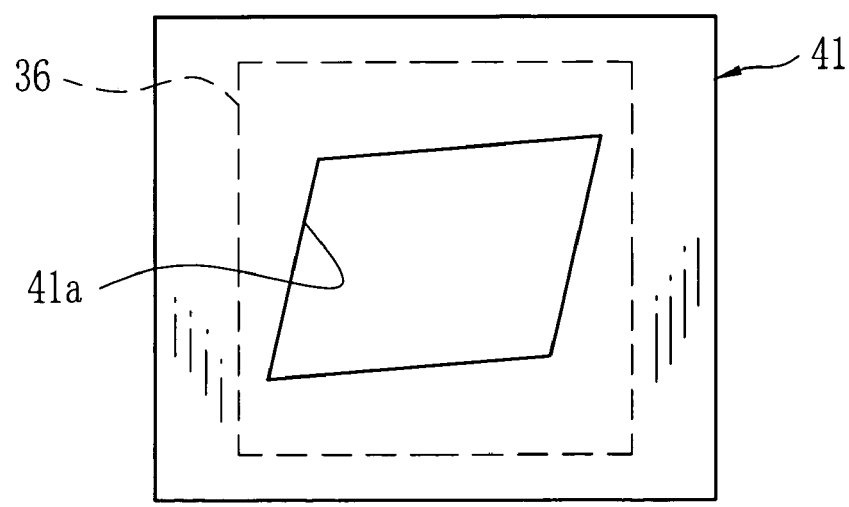
FIG. 3B is a plan view of the mask plate.

As shown in FIGS. 3A and 3B, located near a light exit face 36*a* of the rod integrator 36 is a mask plate 41. The mask plate 41 is so disposed that its planar surfaces can be vertical to an outgoing light axis OA extending from the rod integrator 36. The mask plate 41 regulates a part of the outgoing light to reshape the illumination area 51 (see FIGS. 2A and 2B) on the DMD 26. The mask plate 41 blocks light leaving only a mask aperture 41*a* formed in the center thereof. The shape of the illumination light will thus be arranged according to the shape of the mask aperture 41*a*. The mask aperture 41*a* is formed having oblique angles in a substantially rhombus shape, one of whose diagonal lines is longer than the other. This aperture can reshape the illumination area 51 into a substantially rectangular shape on the element face 46*a*.

Since the light axis LA is inclined with respect to the normal N to the element face 46*a*, the illumination area 51 would become of rhombus shape on the element face 46*a* if the mask aperture is formed into a rectangular shape to conform to the shape of the element face 46*a*. The present invention therefore uses the mask aperture 41*a* of substantially rhombus shape so that the illumination area 51 on the element face 46*a* becomes of substantially rectangular shape, which conforms to the shape of the element face 46*a*. When the illumination light passes through the mask aperture 41*a* to illuminate the element face 46*a*, the illumination area 51 is expanded along the second element face diagonal line while reduced along the first element face diagonal line by the inclination of the light axis LA. Because the mask aperture 41*a* is formed in a substantially rhombus shape whose one diagonal line corresponding to the second element face diagonal line is short and another diagonal line corresponding to the first element face diagonal line is long, the illumination area 51 can be of substantially rectangular shape on the element face 46*a*.

The illumination area 51, the element face 46*a*, and the light transmitting portion 48*a* will therefore have similar shapes, which ensure the illumination light to illuminate throughout the whole element face 46*a*. In addition, the illumination area 51 never runs off the light transmitting portion 48*a*, thus there occurs no harmful light reflecting on the boundary of light transmitting portion 48*a* and the light shielding portion 48*b*.

Figure 4A:
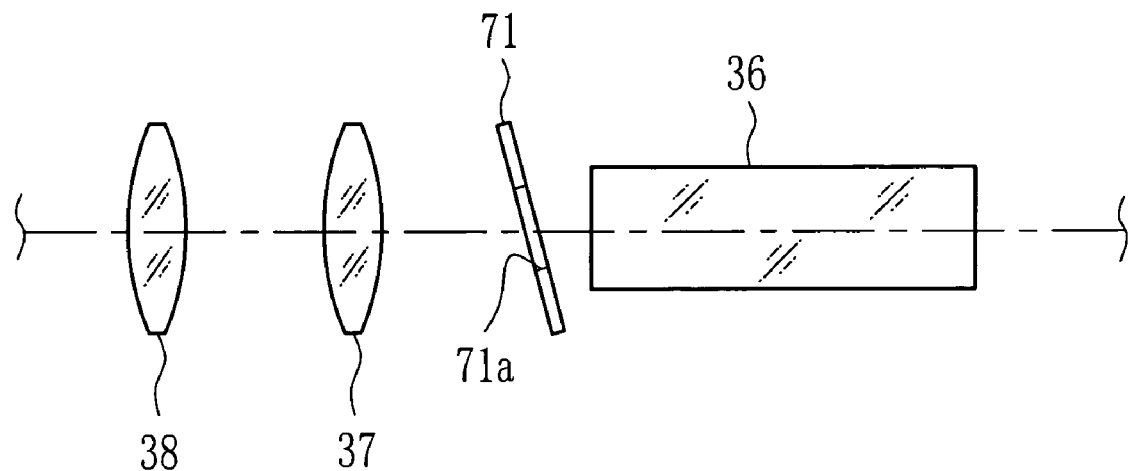
FIG. 4A is an explanatory view of an illumination optical system illustrating a mask plate being inclined to reshape an illumination area.
Figure 4B:
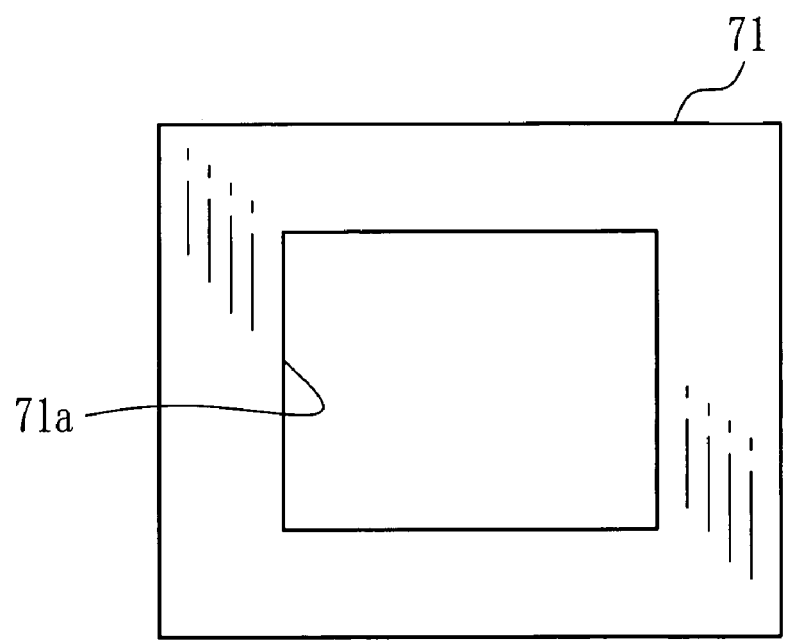
FIG. 4B is a plan view of the mask plate.

In the above embodiment, the creation of harmful light is prevented by reshaping the illumination area into rectangle with using the substantially rhombus mask aperture in the mask plate. However, as an illumination optical system in FIG. 4A, the shape of the illumination area may also be reshaped into a rectangle on the light receiving surface of the DMD 26 by inclining or turning a mask plate 71 with respect to the outgoing light axis OA from the rod integrator 36. As shown in FIG. 4B, a mask aperture 71*a* of the mask plate 71 is not of rhombus shape, unlike the first embodiment, but of rectangular shape. The mask plate 71*a* is inclined or turned with respect to the light axis depending on the angle of the incident light axis to the DMD 26 from the total reflection prism 24. In this manner, the illumination area of otherwise rhombus shape can be reshaped into a rectangle on the light receiving surface of the DMD 26. Alternatively, the rhombus mask aperture in the first embodiment may be used in combination with the inclined disposal of the mask plate in the second embodiment.

Figure 5:
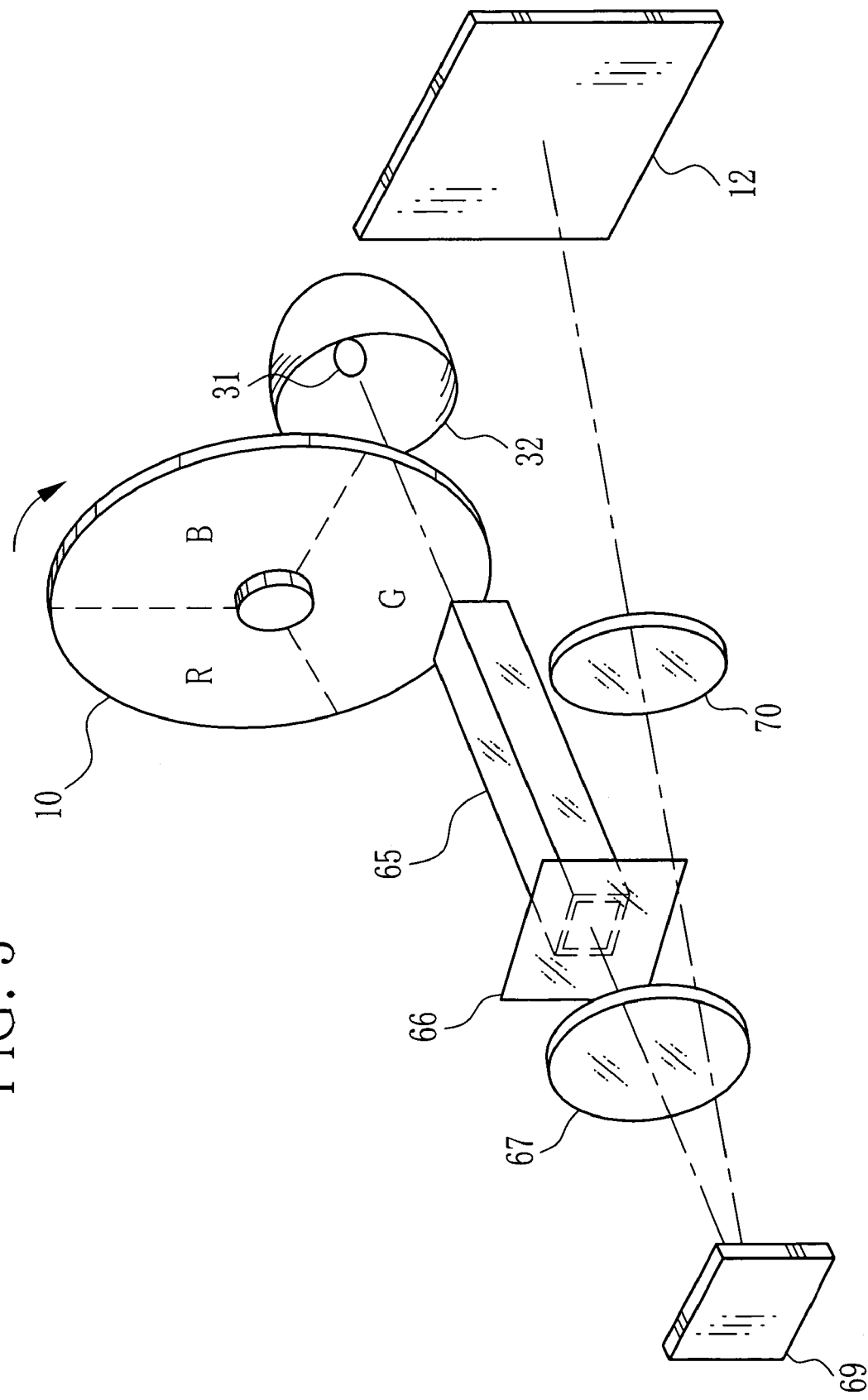
FIG. 5 is a schematic view illustrating another embodiment of the projection type image display apparatus.

FIG. 5 through FIG. 10 illustrate still another embodiment of the projection type image display apparatus according to the present invention. Note that the same elements as the above embodiments carry the same reference numeral and their detailed explanation will be omitted. In FIG. 5, the illumination light from the light source 31 goes through the reflector 32, the color wheel 34, a rod integrator 65, a mask plate 66, and a relay lens 67 as an incident optical system, then enters the DMD 69 at 20 degrees of incident angle to the normal to the DMD from a 45-degree oblique direction. The light beams (i.e. picture images) reflected on the DMD 69 are displayed on the display screen 12 thorough a projection lens 70, i.e. the projection optical system, disposed face to face with the DMD 69.

Equalizing the density of the illumination light from the light source 31, the rod integrator 65 narrows the illumination area of the illumination light into the same 4:3 aspect ratio rectangle as the element face 69*a* on the DMD 69. The mask plate 66 is disposed at the edge of the light exit surface of the rod integrator 65. The mask plate 66 has a mask aperture 66*a*, which narrows the light from the rod integrator 65 again to conform the illumination area to the shape of the element face 69*a*. The relay lens 67 focuses the illumination light narrowed by the mask plate 66 onto the element face 69*a* of the DMD 69.

Even though the DMD 69 is inclined with respect to the light axis of the relay lens 67 by an angle of 20 degrees, the mask aperture 66*a* of the mask plate 66 need not focus a precise real image onto the DMD 69 and therefore the DMD 69 can work properly as long as the image point comes at the intersection of the upper surface of the DMD 65 with the light axis of the relay lens 67.

Figure 6A:
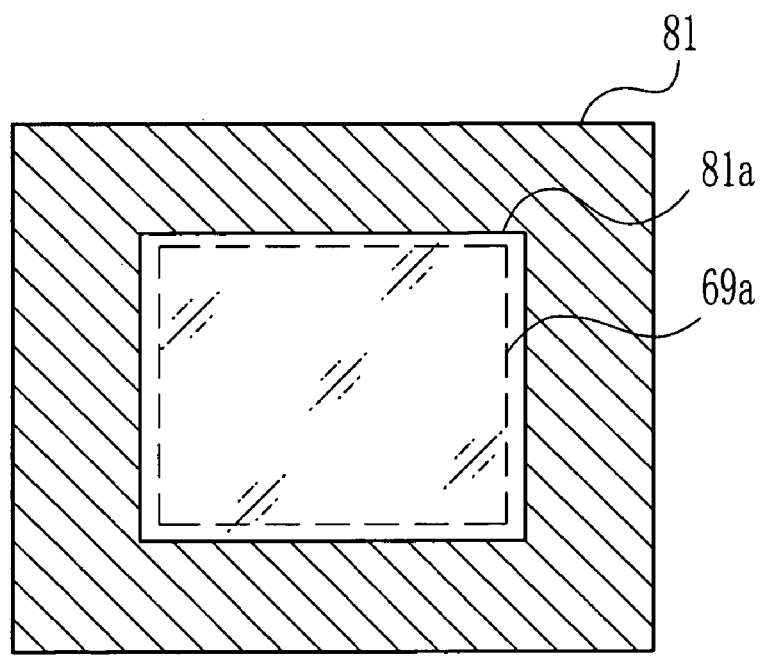
FIG. 6A is an elevation view of the DMD shown in FIG. 5.

The DMD 69 is an LSI which has the mirror elements of, for example, 1024×768 (XGA) arranged in a matrix form. Each mirror element is placed on a MOS transistor and can swing upon on and off of this MOS transistor by an inclination angle of ±10 degrees. As shown in FIG. 6A, a cover 81 for the DMD 69 is provided with a light transmitting portion 81*a* to expose the element face 69*a*.

Figure 6B:
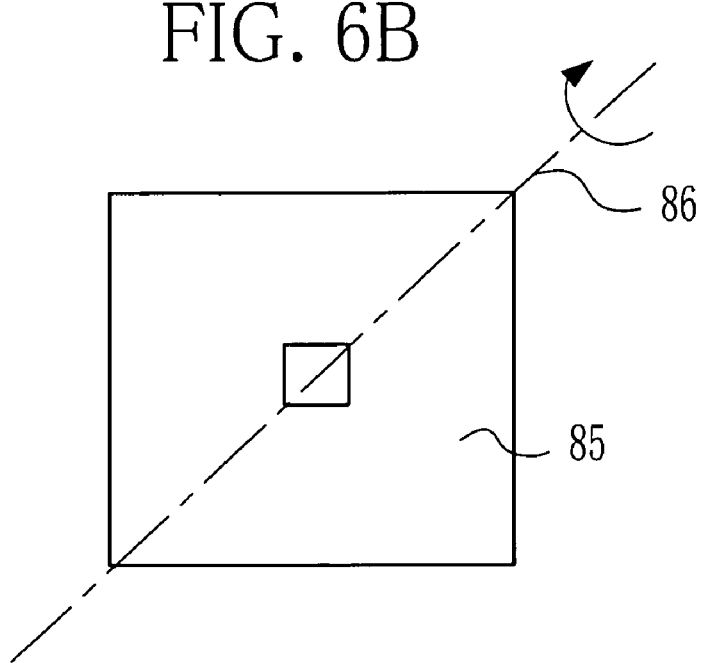
FIG. 6B is a plan view of a micromirror.
Figure 7:
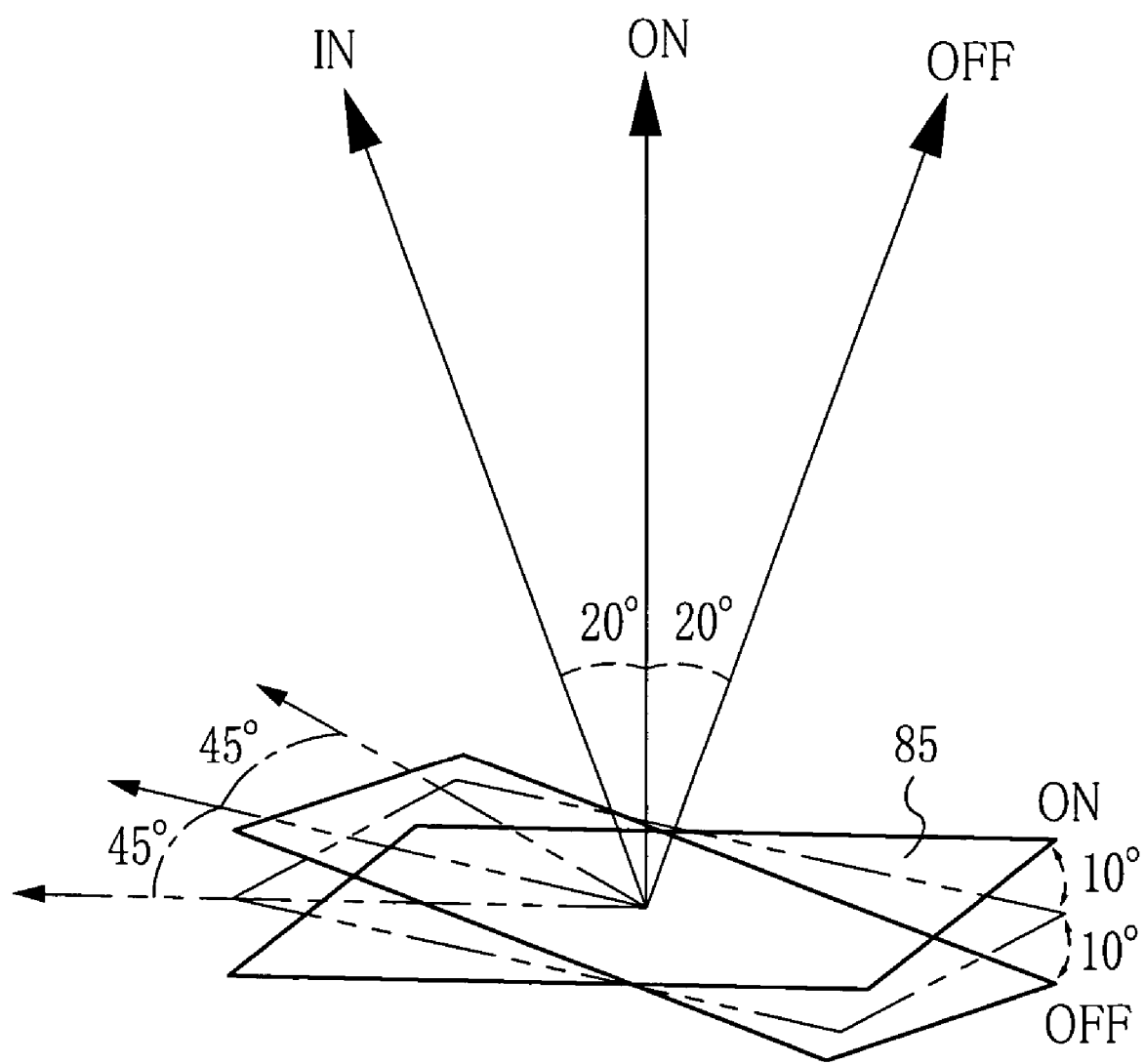
FIG. 7 is an explanatory view illustrating a swinging motion of the micromirror shown in FIG. 6 and its light reflection.

As shown in FIG. 6B and FIG. 7, a single mirror element 85 that corresponds to one pixel is of square shape and swings on the upper left and lower right vertexes as two swing ends (namely, swinging on the diagonal line 86 as a rotation axis) to both sides by 10 degrees. When the MOS transistor is turned on, the mirror element 85 swings by 10 degrees to bring down its upper left vertex. When the MOS transistor is turned off, in contrast, the mirror element 85 swings to bring up the upper left vertex. If the illumination light from the light source 31 enters the DMD 69 from a 45 degree upper left direction at 20 degrees of incident angle, the illumination light striking the ON state mirror elements is reflected to the front direction of DMD and enters the relay lens 70. To the contrary, the illumination light striking the OFF state mirror elements is reflected by 40 degrees of its incident direction and goes apart from the relay lens 70. Combination of the mirror elements with their MOS transistors turned on (bright pixels) and the mirror elements with their MOS transistors turned off (dark pixels) enables the image reproduction. In addition, by controlling the duty ratio of each pixel, the gradation can be expressed. And the full color image can be reproduced by controlling the on duty during the period of each three primary colors given by the color wheel 34.

The relay lens 67 directs the illumination light to enter the DMD 69 from the 45 degree upper left direction at 20 degrees of incident angle, as described above. Therefore, even if the end face of the rod integrator 65 is accurately shaped into the 4:3 aspect ratio rectangle, the illumination area would be deformed obliquely on the DMD 69.

Figure 8:
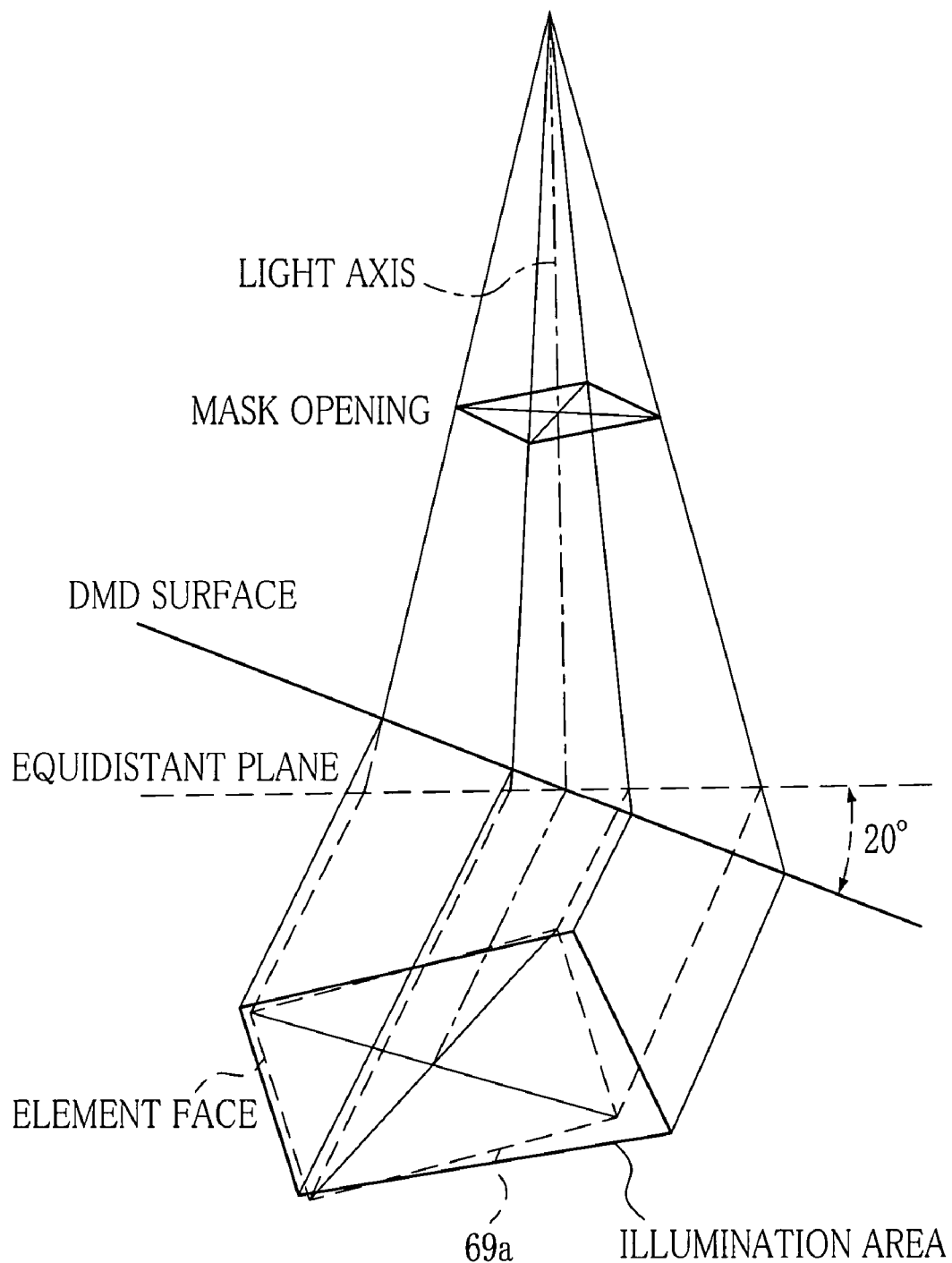
FIG. 8 is an explanatory view illustrating deformation of illumination area.

Such deformation is depicted in FIG. 8. In FIG. 8, the mask aperture is accurate 4:3 ratio rectangle, and if the element face 69*a* of the DMD 69 is disposed face to face with the relay lens 67 (i.e. zero degrees of incident angle), the illumination area on the DMD 69 would also be the 4:3 ratio rectangle as illustrated with a dotted line in the figure. In reality, however, the light passing the relay lens 67 enters the DMD 69 from the 45 degree upper left direction at 20 degrees of incident angle. The light about the upper left vertex of the mask aperture comes to take a shorter distance between the relay lens 67 and the DMD 69 while the light about the lower right vertex of the mask aperture takes longer distance from the relay lens 67 and the DMD 69. Since the image is becoming smaller as it closes to the lens and becoming larger as it moves away, the actual illumination area on the DMD 69 is obliquely deformed with the reduced upper left corner and the expanded lower right corner as illustrated with a solid line in the figure.

Figure 9:
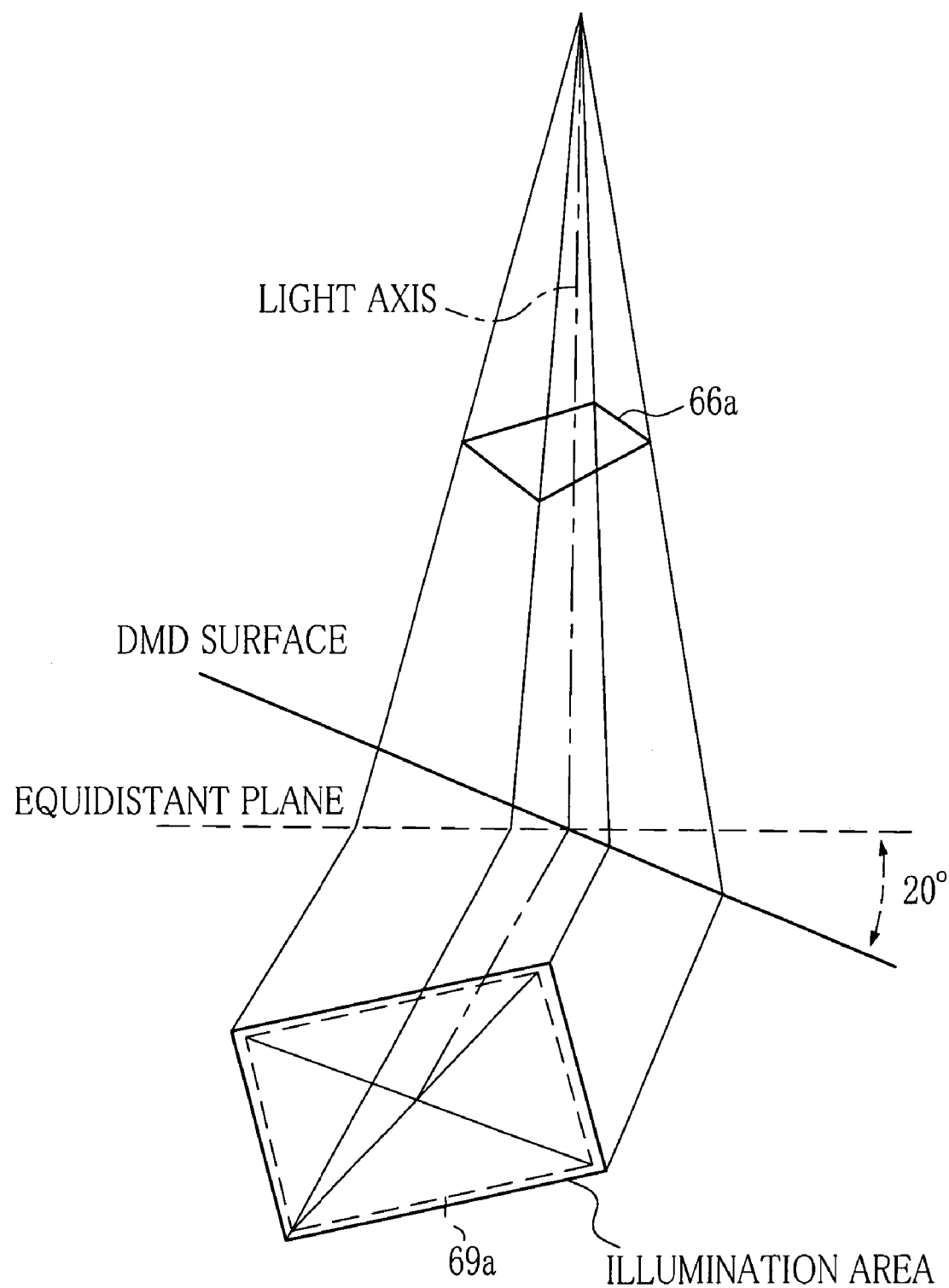
FIG. 9 is an explanatory view illustrating optical effect of the mask plate shown in FIG. 5.

The mask plate 66 reshapes an image form so that the light entering from the 45 degree upper left direction at 20 degrees of incident angle can provide the illumination area of accurate 4:3 rectangular shape on the DMD 69. Namely, as shown in FIG. 9, the mask aperture 66*a* of the mask plate 66 has a reduced lower right corner and an expanded upper left corner comparing to the accurate 4:3 ratio rectangle. This shape of the mask aperture 66*a* ensures the equal illumination throughout the element face 69*a* of the DMD 69.

Assuming that the relay lens 67 is a thin lens and the two intervals, one from the lens to the mask plate 66 and the other from the lens to the upper surface of the DMD 69, are respectively determined to 2 F (F is a focal length of the lens), an image would become almost equal in size to the object. This configuration enables more accurate reshaping of the light from the light source 31 into the shape of the element face 69*a*. The light shielding area 108 of the cover 106 is therefore hardly illuminated and the black floating of the image can be prevented on the display screen.

Figure 10:
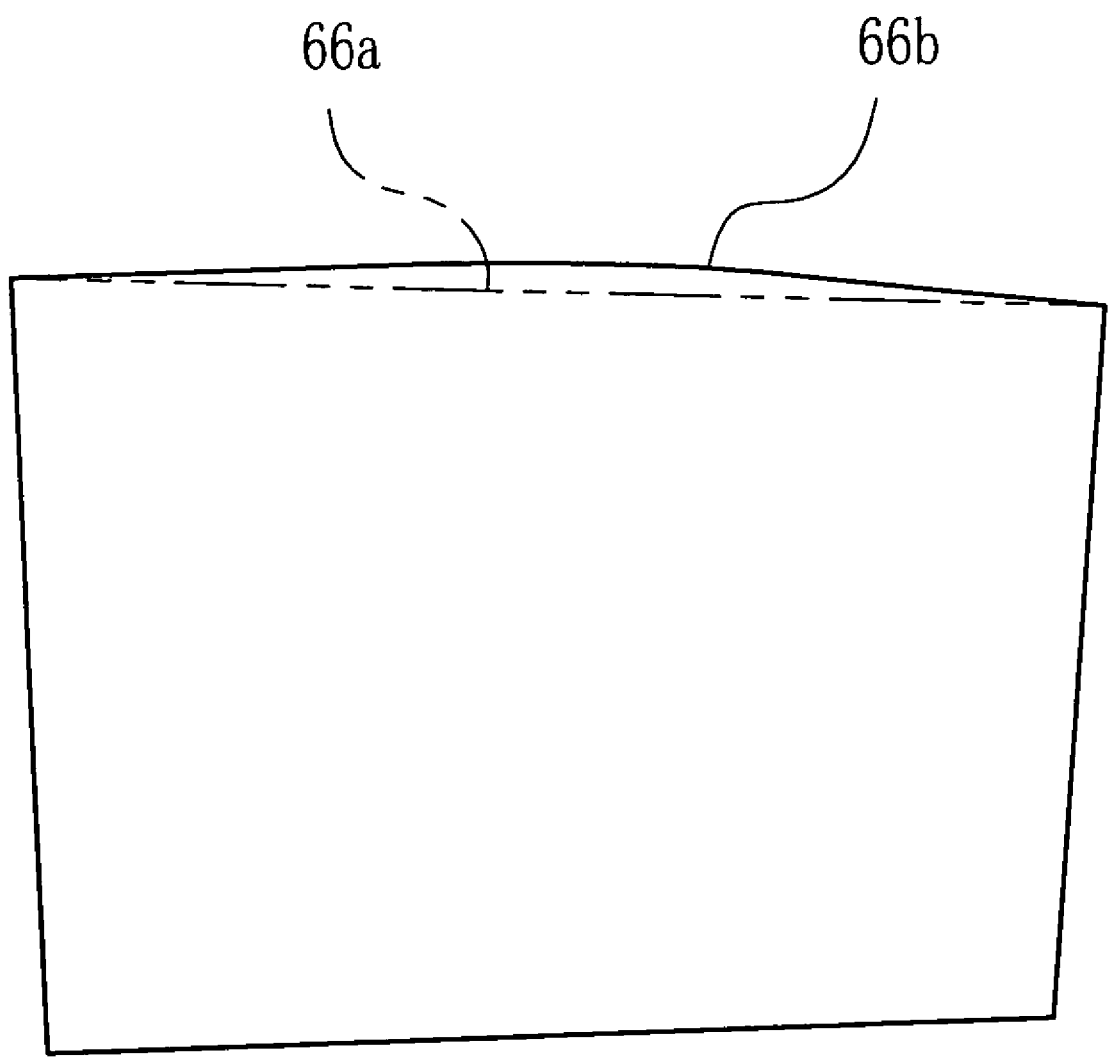
FIG. 10 is an explanatory view of a mask plate for aberration correction.
Figure 11A:
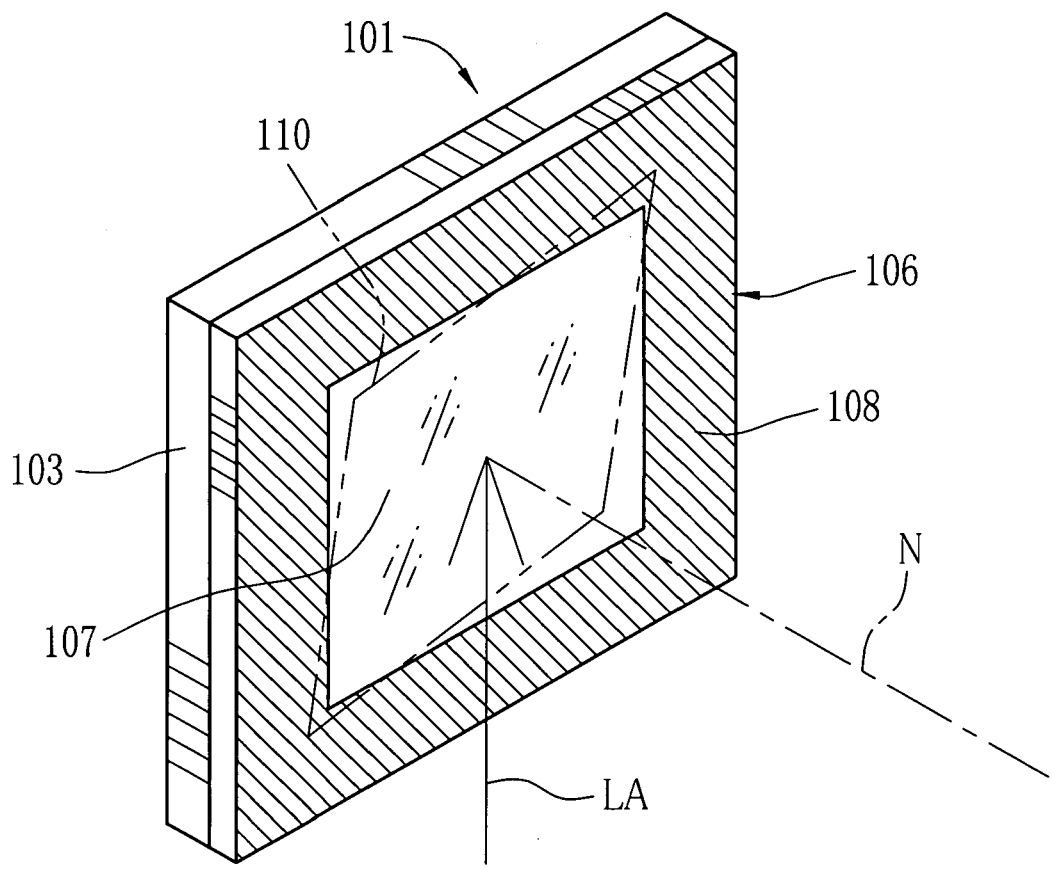
FIG. 11A is a perspective view of a conventional DMD.
Figure 11B:
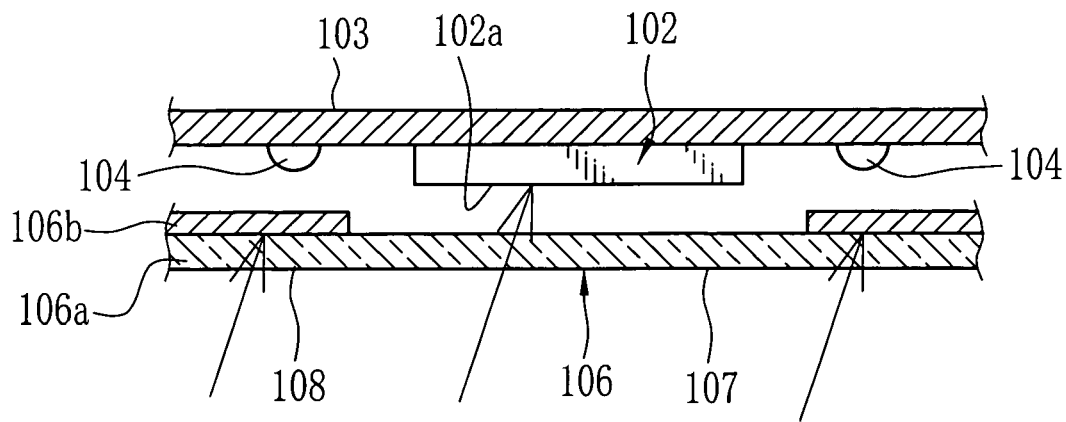
FIG. 11B is a cross section view of the conventional DMD.

The mask aperture 66*a* of the mask plate 66 shown in FIG. 9 is only effective in correcting the distorted light coming from the orthogonal direction. It may be more preferable to use a mask aperture 66*b*, as shown in FIG. 10, which can also correct magnification aberration distortion of the relay lens 67. The magnification aberration distortion is an image distortion phenomenon, in which the image of 4:3 ratio rectangular is distorted into a spinning top shape or a pincushion shape due to the quantity or the quality of the relay lens 67. Since the mask aperture 66*b* is previously deformed to accommodate such distortion to the operating face of the DMD 69, the light will illuminate only the operable area of the DMD 69. There are other types of aberration distortion than the spinning top distortion and the pincushion distortion, the mask aperture will therefore take any shape that can correct such aberration.

As described so far, the present invention is not to be limited to the above embodiments, and all matter contained herein is illustrative and does not limit the scope of the present invention. Thus, obvious modifications may be made within the spirit and scope of the appended claims.

What is claimed is:

1. A projection type image display apparatus for projecting an image light on a screen to display images comprising:

a light source for radiating an illumination light;

an integrator for equalizing illuminance of said illumination light;

a micromirror device with a substantially rectangular element face which has plural mirror elements arranged in a matrix to reflect said equalized illumination light, said micromirror device creating said image light by displacing each of said mirror elements in response to image signals for images so as to modulate said illumination light which enters at an inclined angle with respect to the normal to said element face;

a mask plate with a mask aperture in which said illumination light passes, disposed near a light exit face of said integrator, so as to reshape an illumination area of said illumination light entering said element face into a substantial rectangle; and a projection optical system for projecting said image light on said screen wherein said mask aperture is of substantially rhombus shape with oblique angles such that one of the diagonals of the rhombus shape is longer than the other, and said mask plate is disposed perpendicular to a light axis of said illumination light.

2. A projection type image display apparatus as claimed in claim 1, wherein each of said mirror elements is of square shape and swings on two corners on its diagonal line.

3. A projection type image display apparatus as claimed in claim 2, further comprising:

a total reflection prism for reflecting said illumination light toward said element face and for transmitting said image light reflected on said element face toward said projection optical system.

4. A projection type image display apparatus for projecting an image light on a screen to display images comprising:

a light source for radiating an illumination light;

an integrator for equalizing illuminance of said illumination light;

a micromirror device with a substantially rectangular element face which has plural mirror elements arranged in a matrix to reflect said equalized illumination light, said micromirror device creating said image light by displacing each of said mirror elements in response to image signals for images so as to modulate said illumination light which enters at an inclined angle with respect to the normal to said element face;

an incident optical system having optical power for allowing said illumination light to enter said micromirror device from a specific direction at a predetermined angle;

a mask plate with a mask aperture in which said illumination light passes, disposed near a light exit face of said integrator, said mask aperture having an outline shape of said element face but reduced in said specific direction and expanded in the opposite direction to said specific direction; and a projection optical system for projecting said image light on said screen wherein said micromirror device and said mask plate are arranged at conjugate positions of said incident optical system having optical power.

5. A projection type image display apparatus as claimed in claim 4, wherein each of said mirror elements is of square shape and swings on two corners on its diagonal line.

6. A projection type image display apparatus as claimed in claim 5, wherein said mask aperture is further deformed to correct aberration distortions of said incident optical system.

* * * * *